US006106335A

United States Patent [19]

Merchant et al.

[11] Patent Number: 6,106,335

[45] Date of Patent: Aug. 22, 2000

[54] CROSSTALK CORRECTION IN ELECTRICAL CONNECTORS

[75] Inventors: James R. Merchant, Merrimack, N.H.; Howard Reynolds, Waterbury, Conn.; Rowland White, Lunenburg, Mass.

[73] Assignee: Molex Incorporated, Lisle, Ill.

[21] Appl. No.: 09/092,570

[22] Filed: Jun. 5, 1998

[51] Int. Cl.[7] .......... H02R 13/66

[52] U.S. Cl. .......... 439/620; 439/941; 439/676

[58] Field of Search .......... 439/620, 941, 439/676

[56] References Cited

U.S. PATENT DOCUMENTS

| | | | |
|---|---|---|---|
| 4,950,172 | 8/1990 | Anhalt et al. | 439/108 |
| 5,156,554 | 10/1992 | Rudoy et al. | 439/108 |
| 5,340,334 | 8/1994 | Nguyen | 439/620 |
| 5,399,106 | 3/1995 | Ferry | 439/620 |
| 5,409,401 | 4/1995 | Schaarschmidt et al. | 439/620 |
| 5,431,584 | 7/1995 | Ferry | 439/620 |
| 5,513,065 | 4/1996 | Caveney et al. | 361/311 |
| 5,547,405 | 8/1996 | Pinney et al. | 439/941 |
| 5,580,270 | 12/1996 | Pantland et al. | 439/395 |
| 5,580,280 | 12/1996 | Minich et al. | 439/620 |
| 5,697,817 | 12/1997 | Bouchan et al. | 439/676 |

FOREIGN PATENT DOCUMENTS

| | | |
|---|---|---|
| 709930 | 5/1996 | European Pat. Off. . |
| 750370 | 12/1996 | European Pat. Off. . |

*Primary Examiner*—Renee S. Luebke
*Assistant Examiner*—T. C. Patel
*Attorney, Agent, or Firm*—A. A. Tirva

[57] ABSTRACT

Two rows of insulation displacement contacts are received in a connector housing. The contacts each comprise an insulation displacement end, a medial portion and a tail end. The medial portions are arranged across the housing body in grooves and the tail portions of the two rows extend from the housing in a common plane. Two non-proximate contacts of each row are connected at their medial portions by a capacitative coupling member which may comprise a chip capacitor or a pair of conducting plates connected by a bridge portion.

6 Claims, 5 Drawing Sheets

CROSSTALK CORRECTION IN ELECTRICAL CONNECTORS

FIELD OF THE INVENTION

This invention relates to the correction of crosstalk in electrical connectors. It is particularly concerned with the correction of crosstalk in insulation displacement connectors which can arise between parallel contact elements.

BACKGROUND OF THE INVENTION

The problem of crosstalk in high data rate connectors is well documented and various solutions known to the art. However, there is a need for a correction technique which can compensate for crosstalk as close to the source of that crosstalk as possible.

SUMMARY OF THE INVENTION

The invention aims to provide an electrical connector with a means of crosstalk correction close to the source of crosstalk.

In its broadest form, the invention resides in a capacitative coupling across the medial portions of a pair of contacts. More specifically, there is provided an electrical connector comprising:

a plurality of electrical contacts retained in a housing, the contacts each comprising a first portion, a second portion and a medial portion intermediate the first portion and the second portion; and a capacitance arranged to couple capacitatively the medial portions of two of the contacts to attenuate cross-talk arising therebetween.

This arrangement has the advantage that crosstalk is corrected very close to its original source.

Preferably, the capacitance comprises a capacitor having first and second conductive plates interconnected by a narrow bridge portion and the medial portions of the two contacts.

Preferably, the shape and size of the first and second conductive plates have a size and shape corresponding to the size and shape of the medial portions of the contacts with which they are coupled.

Preferably, the two contacts capacitatively coupled by the capacitor are separated by a third contact and the bridge portion of the capacitor bridges the third contact.

Preferably, the bridge portion is spaced from the third contact to minimize capacitative coupling therebetween.

In the preferred embodiment, the coupling capacitance is generated by two pairs of parallel plates joined by the bridging portion. By sizing and shaping the plate portions of the capacitor, the capacitance of the capacitors formed by the capacitor plates and the medial portions is maximized.

The capacitor may alternatively be a chip capacitor.

The invention also provides an electrical connector comprising:

a housing;

a plurality of electrical contacts received in the housing, each contact having a first portion, a second portion and a medial portion between the first and second portions, the plurality of contacts including at least a first and a second contact; and a capacitative coupling between the first and second contacts, the capacitative coupling comprising a first pair of parallel plates formed by the coupling and the medial portion of the first contact, and a second pair of parallel plates formed by the coupling and the medial portion of the second contact.

The invention also provides an insulation displacement connector comprising:

a contact housing;

a first row of contacts received in the housing, each contact comprising coupling an insulation displacement portion, a medial portion and a tail portion, the medial portions being substantially normal to the plane of the insulation displacement portions and the tail portions being received in a jack housing coupled to the contact housing and a capacitative coupling arranged to couple capacitatively medial portions of a first and second contact of said row of contacts, said first and second contacts being separated by a third contact spaced therebetween, wherein:

said medial portions of said first and second contacts and said capacitative coupling form a first and a second pair of parallel plates.

The invention also provides an insulation displacement connector comprising a housing having a slot arranged along an edge of the housing for receiving a first row of insulation displacement contacts and a second slot arranged along an opposite edge thereof for receiving a second row of insulation displacement contacts, each of said first and second row of insulation displacement contacts comprising an insulation displacement contact end, a tail end and a medial portion, the housing further having a plurality of grooves for receiving said medial portions, said medial portions extending in said grooves towards a central axis of the housing and said tail portions extending away from the housing in a common plane; a contact retaining member arranged over said medial portions and said insulation displacement contact ends of said contacts, said tail ends extending through said contact retaining means;

a first capacitative coupling member arranged to couple capacitatively the medial portions of a first pair of non-proximate contacts of said first row of contacts, said first capacitative coupling member being retained on the contact retaining member between the contact retaining member and the medial portions of the two non-proximate contacts of said first row; and a second capacitative coupling member arranged to capacitatively couple the medial portions of a second pair of non-proximate contacts of said second row contacts, said second capacitative coupling member being retained on the contact retaining member between the contact retaining member and the medial portions of the two non-proximate contacts of said second row, whereby said first and second capacitative coupling members act to attenuate cross-talk respectively between the first and second pairs of non-proximate contacts.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENT

Figure 1:
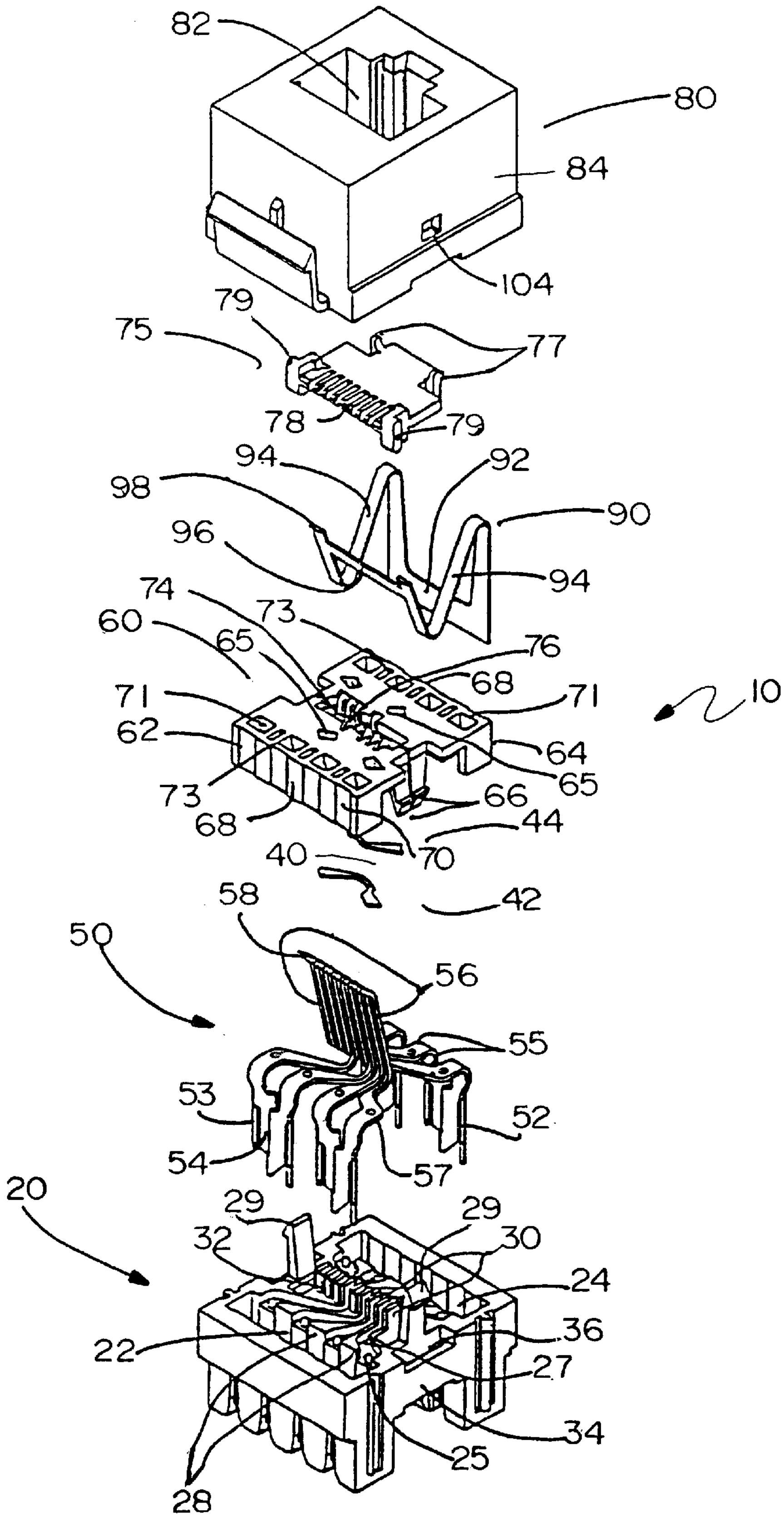
FIG. 1 is an exploded view of a first embodiment of the invention.

The connector 10 of FIG. 1 comprises a connector body 20, a set of contacts 50, a pair of capacitors 40,42, a contact retainer comprising first and second retainer halves 62,64, a shutter spring 90, a shutter 75 and a jack body 80.

The connector body 20 has two elongate apertures 22,24, each of which extends into four individual apertures (not shown), each aperture being shaped to receive the insulation displacement end of one of the set of insulation displacement contacts 50. The insulation displacement ends are comprised of a pair of contact tines 53,54 defining an elongate slot and having tapered inner ends to provide a mouth to the slot. The tines are folded about the slot to form a V-shape in cross-section. This type of insulation displacement contact and the manner in which it is retained in the housing is known from our earlier application, WO 92/22941, the contents of which are incorporated herein by reference.

The connector body can receive eight contacts arranged in two rows of four. It can be seen from FIGS. 1, 4 and 5 that each of the contacts 50 comprises an insulation displacement portion 52, a medial portion 55 and a tail portion 56. The tail portions of each of the eight contacts are equidistantly spaced from one another and extend in parallel away from the connector body in a common plane at a slight angle to the plane of the insulation displacement contact portion 52. As can be seen from FIG. 2, the tail portions are arranged in an aperture 82 in the jack body 80 to make electrical contact with conductors on a plug inserted into the socket. Each of the tail portions is bent at its end 58 away from the side on which the plug is inserted to prevent the tail potions snagging on the housing of the jack body when a plug is inserted.

The medial portions 55 of the contacts each includes a locating hole 57 which is engaged on a corresponding post 25 on the underside of the connector body. The connector body defines a series of four channels 27 on each side which are shaped to receive snugly the medical portions 55 of the contacts. Thus the contacts are received in channels defined by the walls of upstanding portions 28 on the underside of the channel. These upstanding portions each terminate along a central axis of the connector body in a small upstanding wall 30 which has the effect of separating the bases of the tail portions and shielding the individual contacts over a portion of their length. Between each of four of the upstanding walls on each side is arranged stop member 32.

The connector body 20 has a pair of upstanding sprung snap teeth 29 arranged at opposite ends of the central axis of the body for connection of the jack body 80 to the connector body 20. The jack body 80 has a pair of recesses 102 in its side walls 84 into which the teeth 29 are received to hold the two parts together.

Between the wall of the connector body on which the snap teeth are formed and the outer wall 34 of the body is formed a through slot 36 which receives snap teeth 66 on the contact retainer in position on the connector body 20. The contact retainer is formed of two halves 62,64 each having a snap tooth 66 which is received in the slot 36 one on each side of the upstanding snap tooth 29.

Figure 2:
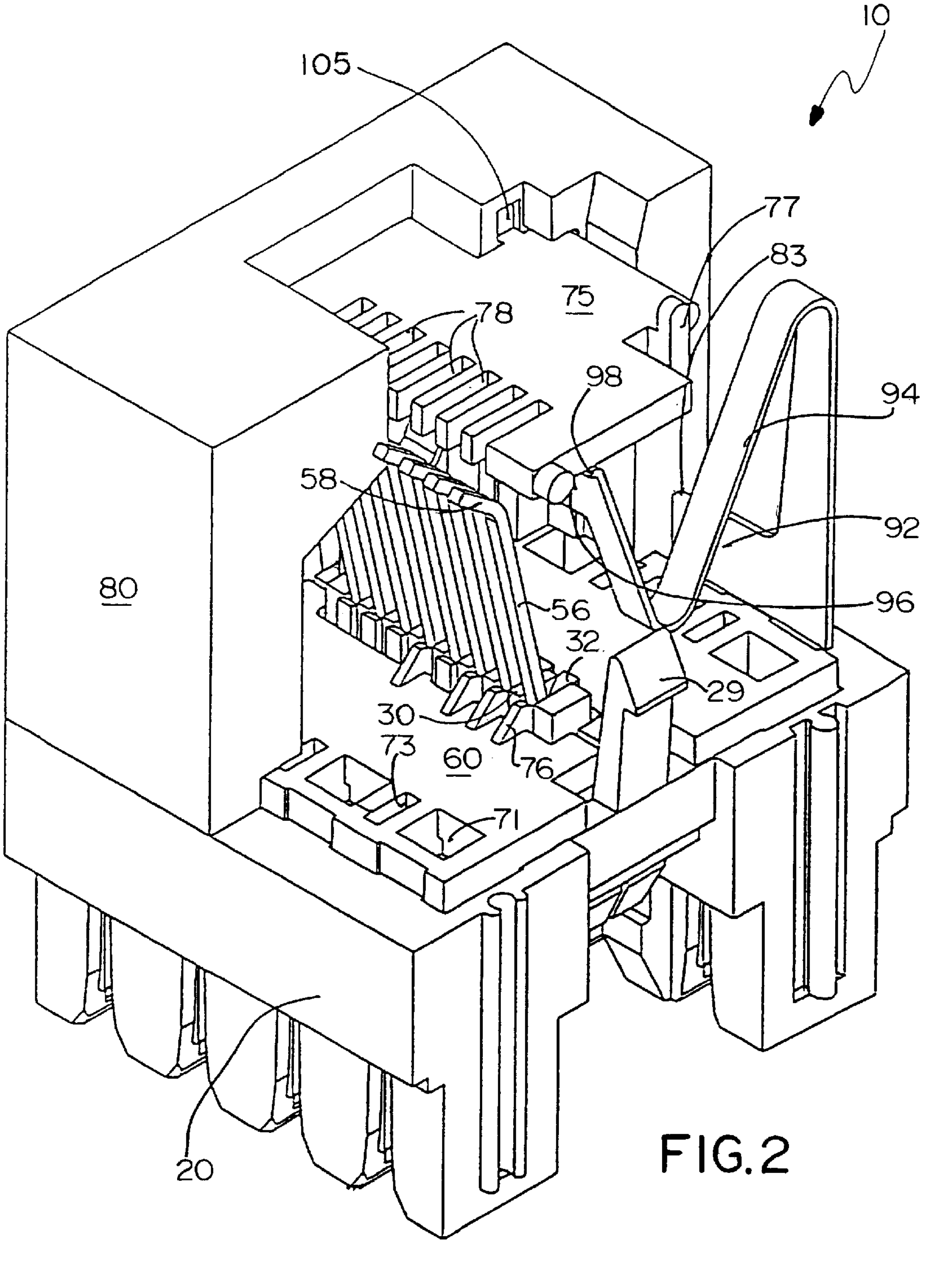
FIG. 2 is a perspective view, partially cut away, of the embodiment of FIG. 1.
Figure 3:
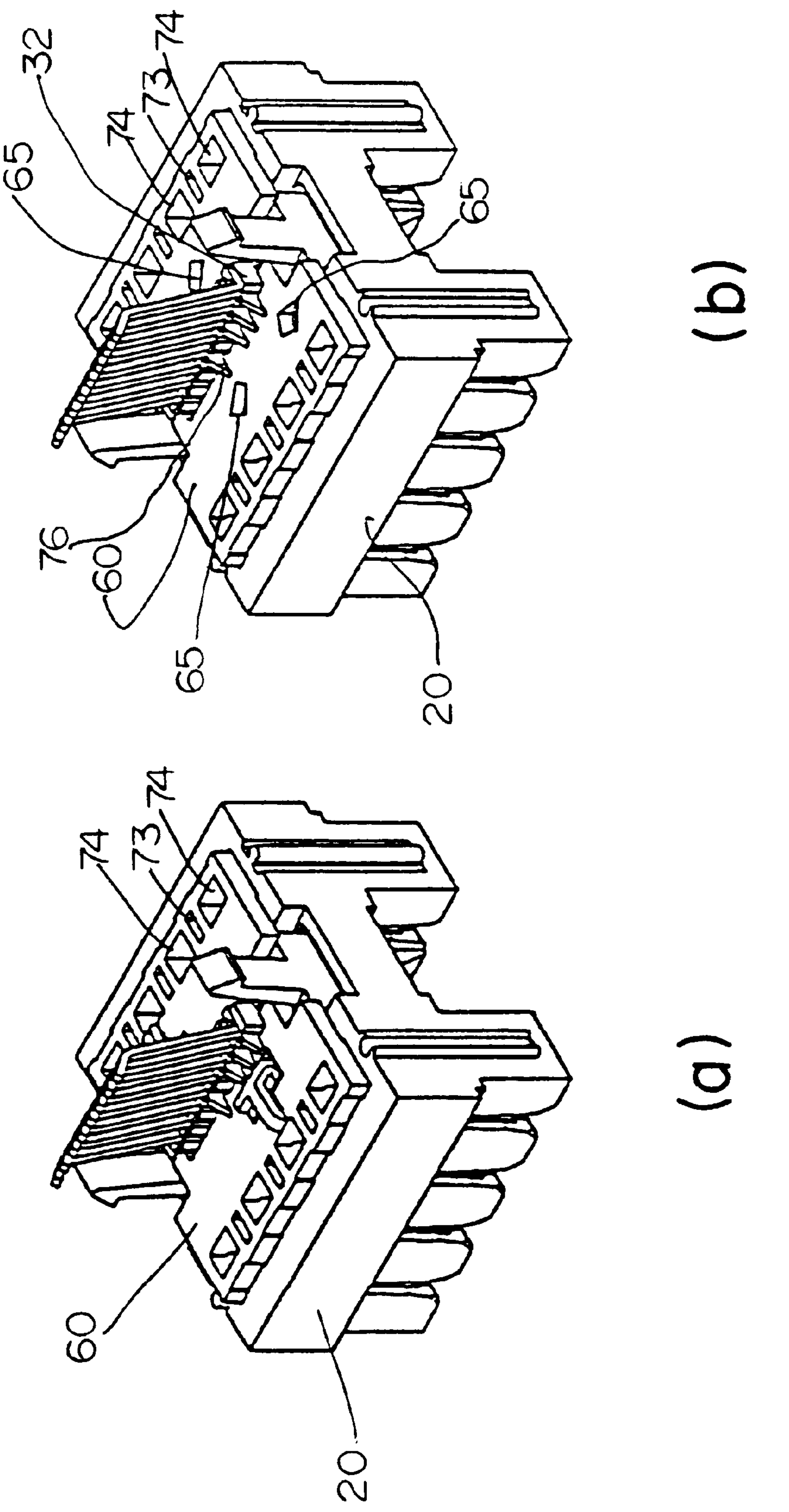
FIGS. 3(*a*) and (*b*) show two alternative embodiments of the contact retainer of FIG. 1 assembled on the contact body.

As can be seen from FIGS. 1 and 2, the side walls 68 of the contact retainer 60 are received in the contact receiving slots of the connector body 20 to hold the contacts in position. The side walls of the contact retainer have wide grooves 70 which correspond to a similar feature on the side walls of the slots in the connector body to assist in locating the contact retainer.

On the top wall of the retainer along each of the sides is arranged a series of four square apertures 71 which overlie the insulation displacement contacts. A smaller rectangular aperture 73 is arranged between adjacent square apertures.

Each of the contact retainer halves includes a pair of apertures 65 which overlie a capacitor 42,19 which is engaged to the underside of the contact retaining half and will be described in greater detail.

The inside edges of the too retaining halves are recessed to define a slot 74 therebetween. Each of the two halves has four guide fingers 76 extending into the slot. The position of the fingers corresponds to the position of the tail pieces of the contacts arranged on the side of the connector body overlaid by the contact retainer. As can be seen from FIG. 2, the upstanding walls 30 separating the tail portions 56 on the connector body extend up through the slot 74 defined by the two contact retainer halves. The tail portions are positioned against movement by the fingers 76 on one side and the stops 32 arranged between the upstanding walls on the other side.

On the jack body the shutter spring 90 is held in position in a groove 83 (FIG. 2) which receives a medial portion 92 of the spring. The spring has a pair of Z-shaped spring portions 94 connected at their one ends by the medial portion 92 and towards their outer ends by a second medial portion 96. The ends 98 of the Z-shaped portions beyond the second medial portions are curved to sit under the shutter 75.

The shutter 75 has a pair of elongate slides 77 which slide in a slot 105 on either side of the jack body. A second pair of sliders 79 is provided at the front of the shutter which slide in corresponding grooves in the jack body. The shutter also has a series of either parallel slots 78 along its one side.

A jack plug is inserted into the jack body by pushing the jack against the outer wall of the shutter 75. The action of the jack forces the spring to open and the shutter slides down the grooves in the jack body. The slots in the shutter pass over the tail portions of the contacts until the shutter reaches the bottom of its travel with the plug latched in place on the jack body. Thus, the shutter has a zero footprint requiring no space tc store the shutter when a plug is in situ.

When operating at high frequency such as required for high data rate connectors, cross-talk can be generated between contacts which can result in corruption of data. The contacts illustrated are arranged as contact pairs. In the arrangement shown, cross-talk is particularly prone to arise between the first and third contacts of each row, numbering from right to left in FIG. 4.

It is well known that cross-talk may be corrected capacitatively and it is also understood in the art that cross-talk is best corrected as near to its source as possible. Cross-talk arises due to the parallel conductors and, as can be seen from FIG. 4*a*, may be corrected by a plate capacitor 42 which is arranged to overlie the first and third contacts to minimize cross-talk therebetween. The capacitor comprises a pair of plates 43,45 separated by a bridge portion 44 which includes a recess 46 to enable the capacitor to bridge, without interfering with, the intermediate second contact. The shape of the two capacitor plates is not identical but chosen so that they overlie the medial portions of the contacts. The approximate portions are shown hatched and numbered 48 in FIG. 4*b*. Thus, the plates of the capacitor are sized and shaped according to the size and shape of the contacts. The capacitor is held on the underside 12 of the contact retainer such that a small gap is present between the capacitor and the respective underlying contact portions. Thus, the plates of the capacitor form a pair of parallel plate capacitors with the medial portions of the first and third contacts of the row. These capacitances are sufficient to correct for cross-talk that arises and may be in the order of 1 pF.

The capacitors are preferably made of lacquered brass. Circuit board lacquer is a suitable lacquer.

Figure 4A:
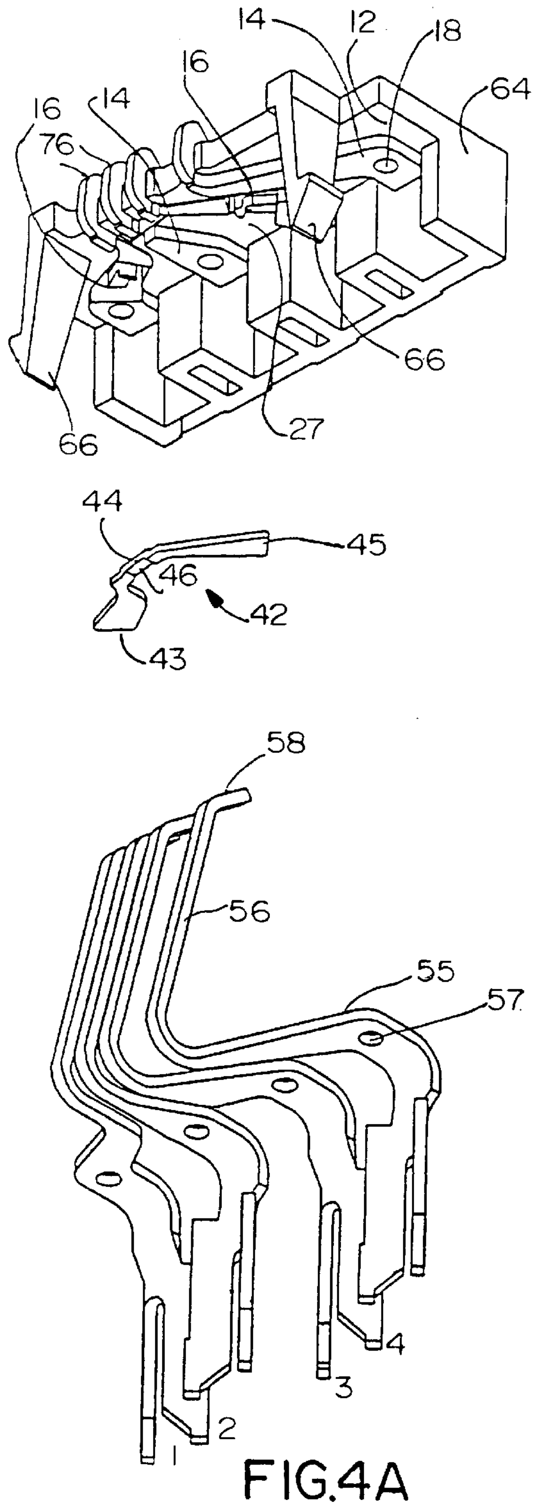
FIGS. 4*a* and 4*b* are exploded views showing how a crosstalk correcting member is inserted in a half of the contact retainer.
Figure 4B:
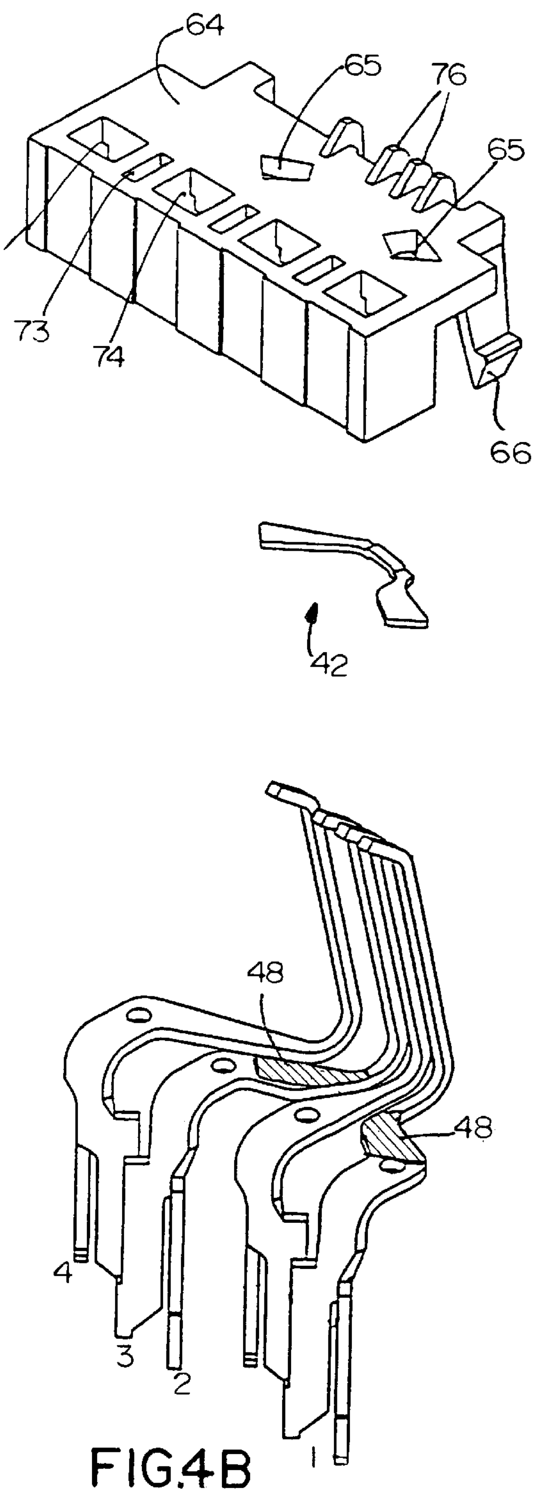

The manner in which the capacitors are retained may be seen from FIG. 4*a* which shows the underside 12 of one half 64 of the contact retainer. On the underside is a series of ridges 14 which correspond to, and when in position, extend into the shaped grooves 27 which receive the medial portions of the contacts on the connector body. Each of the ridges has an aperture 18 which receives one of the posts in the grooves on the connector body. A part 16 of the first and third ridges is cut away and the capacitor is received, as a push fit into the cut away portion. A portion of the second, intermediate ridge is also cut away to receive the bridging portion. The shape of the capacitor is chosen so that the bridging potion crosses the intermediate contact at its thinnest point. The bridge itself is relatively thin and these two factors, in combination with the increased distance caused by the step in the bridge ensure that there is substantially no capacitive coupling between the capacitor and the second, intermediate, contact.

An alternative to the plate capacitor is illustrated in FIG. 5. Here, a chip capacitor 19 is used across the first and third contacts. The ridges on the underside of the contact retainer are cut away to accommodate the chip capacitor. The chip capacitor 19 has contact ends 101 and 102 which are arranged to make electrical contact with surfaces 48 of the first and third contacts of each row and a dielectric between them. Thus, there is a single capacitative coupling between the contacts in contrast to the pair of capacitors formed by the embodiment of FIG. 4.

Figure 5A:
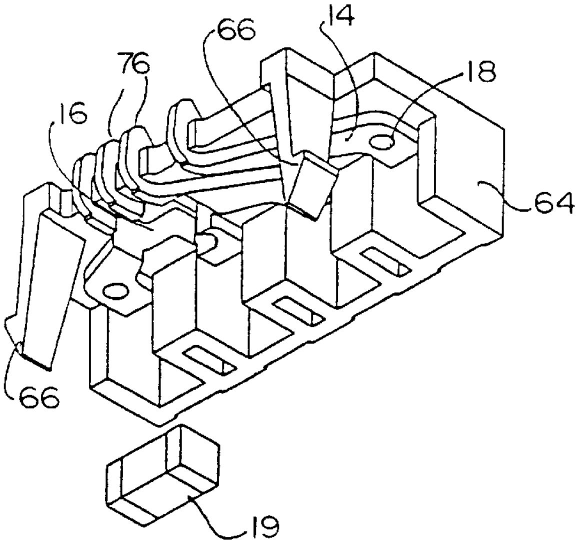
FIGS. 5*a* and 5*b* are views similar to FIG. 4 for a second embodiment of the invention.
Figure 5A:
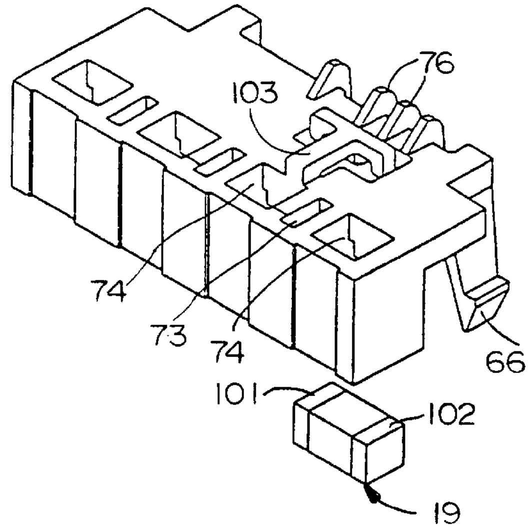
Figure 5A:
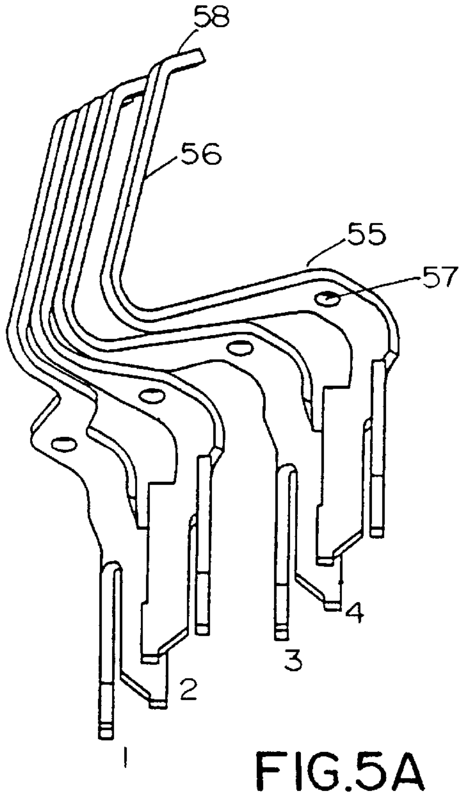
Figure 5B:
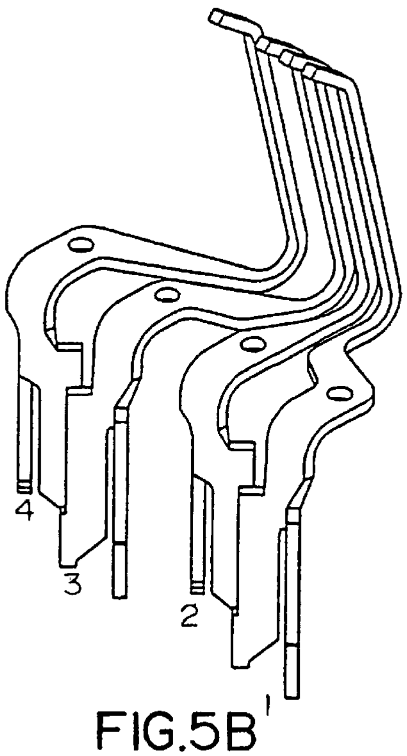

Capacitor 19 is located in the underside 12 of the contact retainer, and the "T" shaped member 103 shown in FIG. 5B is a plastic spring member molded integrally with the contact retainer, its purpose being to hold the capacitor 19 in close electrical contact with surfaces 48 of the contacts. Because chip capacitor components may be delicate, this member is shaped only to apply pressure at the metallic contact ends 101 and 102 of the capacitor and not in the middle of the component.

The embodiments described are particularly effective in reducing cross-talk as the capacitances are placed very close to the source of the cross-talk.

We claim:

1. An insulation displacement connector comprising:

a contact housing;

a first row of contacts received in the housing, each contact comprising coupling an insulation displacement portion, a medial portion and a tail portion, the medial portions being substantially normal to the plane of the insulation displacement portions and the tail portions being received in a jack housing coupled to the contact housing and a capacitative coupling arranged to couple capacitatively medial portions of a first and second contact of said row of contacts, said first and second contacts being separated by a third contact spaced therebetween, wherein:

said medial portions of said first and second contacts and said capacitative coupling form a first and a second pair of parallel plates;

the capacitative coupling comprises a first and a second conductive plate, said first and second conductive plates connected by a conductive bridge portion, said bridge portion overlying the medial portion of said third contact and being spaced therefrom and wherein said insulation displacement connector comprises a second row of contacts, wherein the insulation displacement portions of said first row of contacts are received along a first edge of said housing and the insulation displacement portions of the second row of contacts are received along a second edge of said housing, the medial portions of the contacts of the first and second rows of contacts being substantially normal to the insulation displacement portions and extending towards the center of the housing, the tail portions of the first and second rows of contacts extending away from the center of the housing in a common plane.

2. An insulation displacement connector according to claim 1, further comprising a contact retainer arranged on the housing to retain the medial portions of said contacts and said insulation displacement portions of said contacts between said housing and said contact retainer, said contact retainer having a first portion for retaining said first row of contacts and a second portion for retaining said second row of contacts.

3. An insulation displacement connector comprising a housing having a slot arranged along an edge of the housing for receiving a first row of insulation displacement contacts and a second slot arranged along an opposite edge thereof for receiving a second row of insulation displacement contacts, each of said first and second row of insulation displacement contacts comprising an insulation displacement contact end, a tail end and a medial portion, the housing further having a plurality of grooves for receiving said medial portions, said medial portions extending in said grooves towards a central axis of the housing and said tail portions extending away from the housing in a common plane; a contact retaining member arranged over said medial portions and said insulation displacement contact ends of said contacts, said tail ends extending through said contact retaining means;

a first capacitative coupling member arranged to couple capacitatively the medial portions of a first pair of non-proximate contacts of said first row of contacts, said first capacitative coupling member being retained on the contact retaining member between the contact retaining member and the medial portions of the two non-proximate contacts of said first row; and a second capacitative coupling member arranged to capacitatively couple the medial portions of a second pair of non-proximate contacts of said second row contacts, said second capacitative coupling member being retained on the contact retaining member between the contact retaining member and the medial portions of the two non-proximate contacts of said second row, whereby said first and second capacitative coupling members act to attenuate cross-talk respectively between the first and second pairs of non-proximate contacts.

4. An insulation displacement connector according to claim 3, wherein the first and second capacitative coupling members are chip capacitors.

5. An insulation displacement connector according to claim 3, wherein the first ani second capacitative coupling members each comprises a first and second capacitative plate joined by a bridge.

6. An insulation displacement connector according to claim 5, wherein the capacitative plates are sized and shaped to correspond to the size and shape of the medial portions of the contacts they overlie.

* * * * *